(No Model.)

M. MASON & G. T. CARTER.
HOSE WINDING MACHINE.

No. 391,169. Patented Oct. 16, 1888.

WITNESSES:
Manuel Rodriguez.
Clarence C. Weightman.

INVENTORS:
Mathew Mason.
George T. Carter.
by Wm. H. Weightman,
Atty

UNITED STATES PATENT OFFICE.

MATTHEW MASON, OF BROOKLYN, NEW YORK, AND GEORGE T. CARTER, OF ELIZABETH, NEW JERSEY; SAID CARTER ASSIGNOR TO JAMES LYONS, OF BROOKLYN, NEW YORK.

HOSE-WINDING MACHINE.

SPECIFICATION forming part of Letters Patent No. 391,169, dated October 16, 1888.

Application filed June 16, 1888. Serial No. 277,309. (No model.)

*To all whom it may concern:*

Be it known that we, MATTHEW MASON, of Brooklyn, Kings county, and State of New York, and GEORGE T. CARTER, of Elizabeth, Union county, and State of New Jersey, have invented certain new and useful Improvements in Hose-Winding Machinery, of which the following is a specification, reference being had to the accompanying drawings.

The invention relates specially to improvements in the winding of wire about hose as a means of protection for the same; and it consists in the construction, arrangement, and combination of the several parts or portions comprising the machine, as hereinafter described and specified, whereby the wire on its passage to and about the hose is brought first to a reverse bend, upsetting the molecules and then resetting them again in a fixed position around the hose.

Figure 1:
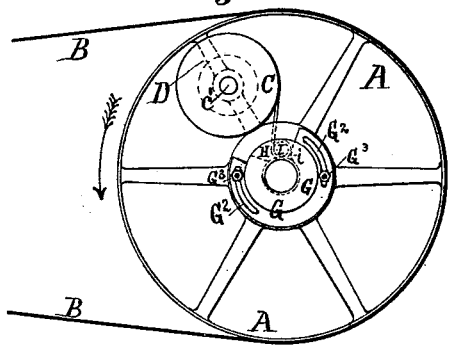
Figure 2:
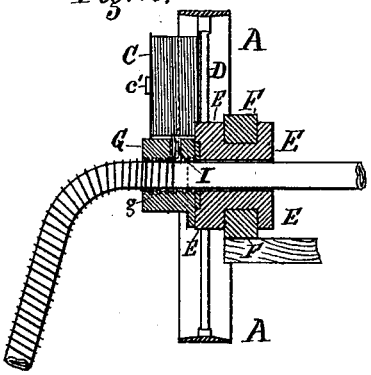
Figure 3:
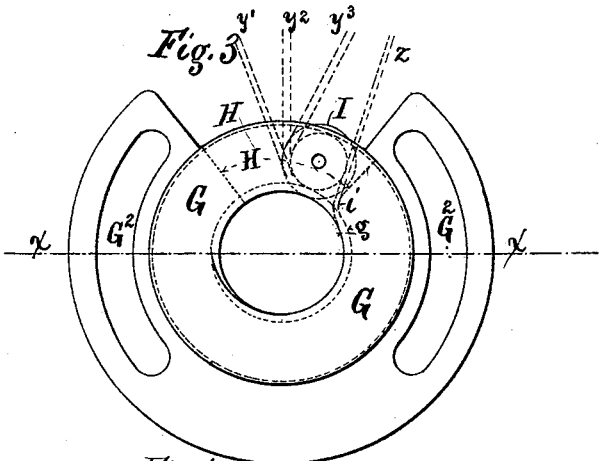
Figure 5:
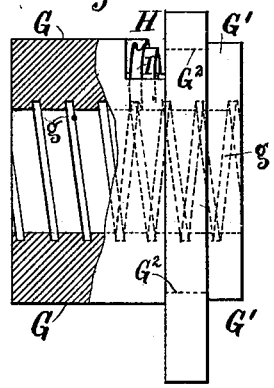
Figure 4:
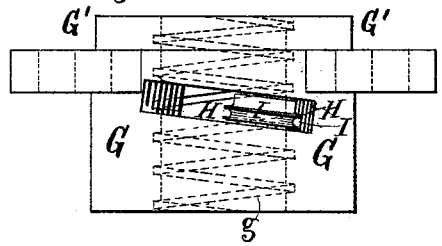

In the drawings, Figures 1 and 2 represent a front elevation and cross-section of a machine embodying our improvements. Figs. 3, 4, and 5 represent front, top, and side views of the die-nut and adjustable guide-slot, whereby the wire as it moves toward the nut is bent to a short bend in a reverse direction to that which it takes in its position about the hose. The front portion of the die-nut is sectioned to show the grooves guiding the placing of the wires and moving the hose.

Similar letters of reference designate like parts or portions in all the figures.

A designates a pulley, and B a belt for driving the same.

C designates a feed-spool, from which the wire passes to the die-nut.

D designates an arm of the pulley, to which the axle $c'$ of the feed-spool C is fastened. The spool C is here represented as fitted to revolve about the axle $c'$; but it may be enlarged and be made concentric with the pulley A, to which it is attached and with which it revolves.

E designates the hub of the wheel A, fitted to revolve in a bearing designated by F.

G designates the die-nut, and H the adjustable guide-slot, through which the wire is passed in its passage to the hose.

I designates a small grooved pulley placed within the guide-slot H to provide for a minimum of friction in the reverse bending of the wire. The inner portion of the die-nut is threaded with feed-groove $g$, within which the wire moves and by means of which, in connection with the wire already wound, the hose is moved regularly along in conjunction with the winding.

$G'$ designates a portion of the die-nut turned and fitted into a counterbore in the hub of the pulley A.

$G^2$ designates one or more slots concentric with the pulley-hub and die-nut, by means of which the position of the small grooved pulley I or the bending corner $i$ is changed according to the required sharpness of the bend of wire required.

$G^3$ are bolts holding the die-nut secure against the pulley A.

According to the position radially of the slots $G^2$ with reference to the horizontal center line, $x\ x$, so is the acuteness of the angle of reverse bend of the wire while being fed from the spool to the hose, as shown by positions $y'$ $y^2$ $y^3$ of the wire represented by dotted lines in Fig. 3.

$z$ designates in dotted lines the location, position, and movement of the winding wire when no anti-friction pulley is used.

According to the closeness with which the wire is expected to hug the hose, the slot H and its pulley I, or corner $i$, is moved to bend the wire to a more acute angle. For a loose wrap or wind, the direction of movement of the wire from the spool C is set at that position, shown by dotted lines at $y'$; for a tighter wrap or wind, the direction and acuteness is changed to that shown by lines at $y^2$, and for a still tighter wrap or wind, by lines at $y^3$. Where the pulley is not used, the wire moves over the corner $i$ in the slot, its angle varying in acuteness similarly with those defined by $y'\ y^2\ y^3$.

To effect the adjustment of the acuteness of the feed of the wire to the hose, the concentric slots $G^2$ cut in the flange of die-nut are preferably used, and bolts $G^3$ are provided to hold the die-nut in position required.

What we claim as new, and desire to secure by Letters Patent, is—

1. In a hose-winding machine, in combination with the operating-pulley and wire-feeding spool, a central die-nut provided with a feed-slot, H, within which is located a reverse-bending pulley, I, against which the wire is forced while being fed to the hose, as and for the purposes set forth.

2. In a hose-winding apparatus, an operating-pulley carrying a wire-feeding spool, in combination with a radially-adjustable central die-nut provided with adjusting-slots $G^2$, and feed-slot H, provided with means, as specified, for reverse-bending the wire as it approaches the hose, substantially as and for purposes set forth.

3. In a hose-winding machine, the combination of the pulley A, feed-spool C, central die-nut, G, slot H, cut in said nut G, pulley I, and adjusting-slots $G^2$, substantially as and for purposes specified.

4. In a hose-winding machine, the combination of the pulley A, feed-spool C, central die-nut, G, slot H, cut in said die-nut and provided with bending-corner $i$, and the adjusting-slots $G^2$, substantially as and for purposes specified.

MATTHEW MASON.
GEORGE T. CARTER.

Witnesses:
WM. H. WEIGHTMAN,
JAMES LYONS.